United States Patent

Doyle

[15] 3,657,580
[45] Apr. 18, 1972

[54] MAGNETICALLY SHIELDED ELECTRICAL MACHINE WITH SUPERCONDUCTING FILED WINDINGS

[72] Inventor: Timothy J. Doyle, Annapolis, Md.

[73] Assignee: The United States of America as represented by the Secretary of the Navy

[22] Filed: Jan. 18, 1971

[21] Appl. No.: 107,211

[52] U.S. Cl. .................................................. 310/52, 310/10
[51] Int. Cl. ........................................................... H02k 9/197
[58] Field of Search ................... 310/10, 40, 52, 61, 86, 98, 310/99, 178, 268

[56] References Cited

UNITED STATES PATENTS

| | | | |
|---|---|---|---|
| 2,211,377 | 8/1940 | Langasser | 310/99 |
| 2,630,466 | 3/1953 | Landis | 310/98 X |
| 523,998 | 8/1894 | Rennerfelt | 310/178 |
| 3,242,418 | 3/1966 | Mela | 310/40 |
| 3,441,755 | 4/1969 | Grunwald | 310/10 |
| 3,471,726 | 10/1969 | Burnier | 310/54 |
| 3,521,091 | 7/1970 | Halas | 310/10 |

Primary Examiner—D. X. Sliney
Attorney—R. S. Sciascia and Q. E. Hodges

[57] ABSTRACT

A superconducting coil is mounted within the rotor of a homopolar machine. The section of the rotor surrounding the superconducting coil is enlarged to accomodate the coil and a dewar type container. Magnetic flux from the solenoid extends beyond the exterior of the rotor and links series connected discs rotating in the solenoid DC axial field.

7 Claims, 1 Drawing Figure

PATENTED APR 18 1972
3,657,580
INVENTOR.
TIMOTHY J. DOYLE
BY [signature] Hodges
ATTORNEY
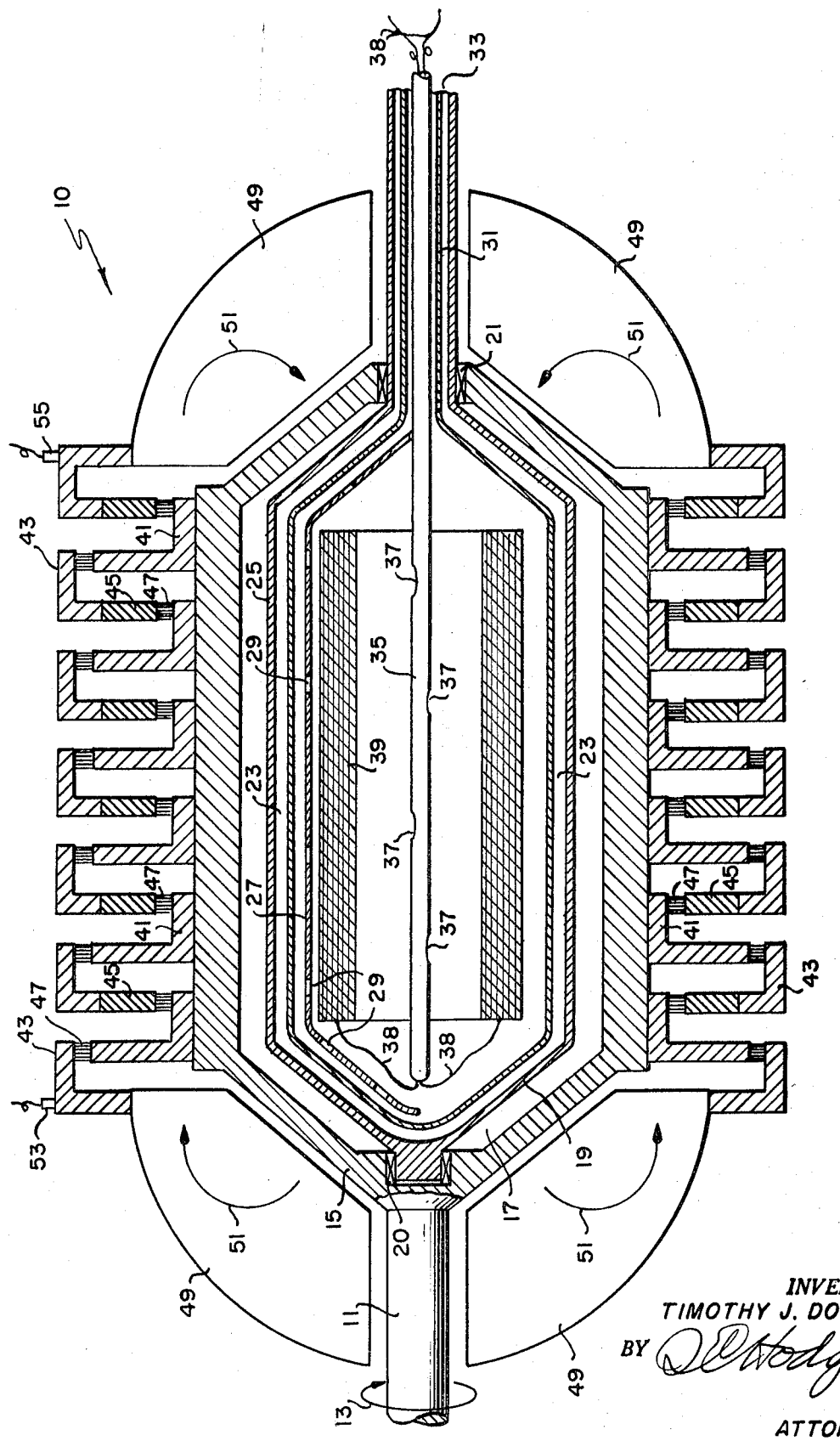

3,657,580

MAGNETICALLY SHIELDED ELECTRICAL MACHINE WITH SUPER-CONDUCTING FILED WINDINGS

The invention described herein may be manufactured and used by or for the Government of the United States of America for Governmental purposes without the payment of any royalties thereon or therefor.

DESCRIPTION OF THE PRIOR ART

Superconducting field windings are known and have been used in the prior art. The principle of superconductivity is that conductive materials operated at cryogenic temperatures undergo a transition to a state of zero or near zero electrical resistivity. This superconductive principle has been applied to electromagnetic generators and electric motors to substantially increase their efficiency while decreasing their size and weight.

However, a substantial problem existing in the prior art has been the attainment of a machine whereby the conductive field windings which operate at near zero Kelvin temperatures may be efficiently cooled and held at the superconducting temperatures and which permits the handling of the high power densities at which the superconducting machines operate.

SUMMARY OF THE INVENTION

This invention relates to electrical motors and generators utilizing superconductive windings which are maintained at near zero Kelvin temperatures. Utilization of superconducting field windings permits reduced size and increase performance when compared to conventional electric systems. A disadvantage of prior art machines however, is that the superconductive coil surrounds the rotating element of the machine introducing a warm hole into the geometry of the superconductive coil container, as the superconductive coil surrounds the rotating element.

In this invention, a portion of the rotor is enlarged to accomodate a dewar housing for the superconductive coil. The superconducting coil is contained within the dewar and a conduit along the longitudinal axis of rotation of the rotor is utilized to introduce electrical leads and cooling fluid to the dewar. The flux axially generated by the coil is contained outside the dewar by an envelope of magnetic material sectioned to provide narrow passages for rotating discs arranged in planes perpendicular to the axis of rotation. A portion of the stator is magnetic material and is arranged in the flux path to further shape the flux field. The current brushes are placed outside the flux field to decrease losses. In addition, as the magnetic field is generated within the rotor, it is possible to concentrate substantially all the generated flux through the active disc area, resulting in higher disc voltages, lower disc currents and reduced joule heating losses.

OBJECTS OF THE INVENTION

A first object of the invention is an electric machine having a superconducting field internal to its rotating element.

A second object of this invention is an electrical machine having reduced heat transfer area in its superconducting coil housing.

A third object of this invention is increased field utilization in the area of the rotating elements, increasing generator voltages.

BRIEF DESCRIPTION OF THE DRAWING

FIG. 1 shows the superconducting machine in cross-section.

DESCRIPTION OF THE PREFERRED EMBODIMENT

Referring now to FIG. 1, a superconducting machine 10 is shown as having a rotor 11 rotating in the direction of arrow 13. Connected to rotor 11 and rotating therewith, is a housing 15 having an internal cavity 17, in which a dewar container 19 is placed. Dewar 19, is supported within housing 15, by bearings 20 and 21, allowing rotation of the housing 15, about the stationary dewar 19.

Dewar 19 is vacuumed jacketed, having vacuum layer 23, between the exterior layer 25, and the cooling vapor return layer 27. The cooling vapor return layer 27, is shown as having openings 29, disposed along its surface. A vacuum jacketed conduit 31, is formed continuous with the dewar 19, the vacuum layer and the cooling vapor layer extending from the dewar through the conduit to conduit opening 33. A cooling fluid inflow line 35 extends through the conduit 31, into dewar 19. The inflow line 35, has a number of openings 37, through which cooling fluid is dispersed from line 35, into the dewar. The electrical lines 38, for the coil 39, are passed through the inflow line 35 and out through opening 33.

Connected to the rotating housing 15 are low resistance discs 41. Stators 43 are connected to the rotating discs 41, through brushes 47. A portion 45 of the stator 43 is made of magnetic material. Magnetic shielding 49 is arranged at each end of the machine to direct the flux from the rotating housing through the magnetic portions 45 of the stator 43.

OPERATION OF THE MACHINE

Superconducting cooling fluid, such as liquid helium is pumped through conduit 35, and into the dewar 19, through openings 37 within conduit 35. The cooling fluid reduces the temperature of the coil 39, to near zero Kelvin degrees, making the coil superconductive. Electrical energy is furnished to the coil through leads 38. Cooling fluid vapor passes through opening 29, within vapor return layer 27, and out through conduit 31. A continuous flow of cooling fluid is thereby permitted to maintain the temperature of the coil 39, at the superconducting temperature. The direction of the field is as shown by arrows 51. Magnetic field shaping elements 49 direct the field from the housing 15 through the magnetic portions 45 of the stator elements with the result that brushes 47 are outside the magnetic field thereby reducing losses.

Rotation of rotor 11, with coil 39 energized, produces electrical energy within the rotating discs 41. The discs are electrically connected through the brushes 47 and the current therein produced is collected at machine terminals 53 and 55.

The principle of the superconducting coil within the rotating housing and the electrical arrangement of the solenoid can easily be extended to an opposed field, quadrapolar or to a split solenoid configuration.

The design of this machine can include an air core acyclic drum or can be used with a shaped field acyclic drum.

Obviously many modifications and variations of the present invention are possible in the light of the above teachings. It is therefore to be understood that within the scope of the appended claims the invention may be practiced otherwise than as specifically described.

What is claimed is:

1. An electric machine, comprising:
   the coil for generating a flux field;
   means for maintaining said coil at a superconducting condition;
   a shaft mounted for rotation and having a cavity along its rotational axis; and
   said coil and said means being mounted in said cavity for developing an axial flux field.

2. An electric machine, as recited in claim 1, wherein:
   said means includes a dewar container;
   said coil is contained within said dewar container; and
   means for mounting said dewar container within said cavity to permit said shaft to rotate about said dewar container.

3. An electric machine, as recited in claim 2, wherein: said dewar is supplied with cooling fluid for maintaining said coil at a superconducting temperature.

4. An electric machine, as recited in claim 3, wherein: said dewar includes means for collecting vapor generated from said cooling fluid and passing it from said dewar.

5. An electric machine, as recited in claim 3, wherein: said means for permitting said shaft to rotate about said dewar includes bearings mounted along said shaft's rotational axis.

6. An electric machine, as recited in claim 3, wherein: said shaft includes a plurality of discs mounted on said shaft;

each said disc being mounted in a plane perpendicular to said shaft's axis of rotation;

said machine having a stator sectioned to permit rotation of said discs;

each said disc being separated by a stator section and being connected to its adjacent stator sections by brushes;

said stator portion between said brushes being magnetic material for shaping said flux and limiting said field substantially to the area of said stator magnetic material.

7. An electric machine, as recited in claim 6, wherein: said dewar includes means for collecting vapor generated from said cooling fluid and passing said vapor from said dewar; and said means for permitting said shaft to rotate about said dewar includes bearings mounted along said shaft's rotational axis.

* * * * *